United States Patent
Teijido et al.

(10) Patent No.: US 7,614,970 B2
(45) Date of Patent: Nov. 10, 2009

(54) TORQUE SENSING ASSEMBLY HAVING DUAL STAGE SPRING COMPRESSION FOR AN AGRICULTURAL MACHINE

(75) Inventors: Joseph Albert Teijido, East Moline, IL (US); Jeffrey Allen Turigliatti, Geneseo, IL (US); Steve Michael Juhasz, Moline, IL (US)

(73) Assignee: Deere & Company, Moline, IL (US)

( * ) Notice: Subject to any disclaimer, the term of this patent is extended or adjusted under 35 U.S.C. 154(b) by 607 days.

(21) Appl. No.: 11/192,888

(22) Filed: Jul. 29, 2005

(65) Prior Publication Data

US 2007/0026984 A1 Feb. 1, 2007

(51) Int. Cl.
| | |
|---|---|
| F16H 55/56 | (2006.01) |
| A01D 41/00 | (2006.01) |
| A01D 41/12 | (2006.01) |
| F16H 61/66 | (2006.01) |

(52) U.S. Cl. .............................. 474/46; 474/8; 474/10; 474/19; 74/377; 475/19; 475/28

(58) Field of Classification Search .................. 474/46, 474/36, 12, 17, 19; 267/168; 74/689, 750, 74/789, 792
See application file for complete search history.

(56) References Cited

U.S. PATENT DOCUMENTS

| | | | |
|---|---|---|---|
| 3,842,637 A | 10/1974 | Wilson | |
| 4,133,225 A * | 1/1979 | Love | 475/19 |
| 6,663,521 B2 * | 12/2003 | Uryu et al. | 474/70 |
| 6,722,112 B2 | 4/2004 | Pierce et al. | 56/11.2 |
| 2005/0043128 A1 * | 2/2005 | Zulawski | 474/19 |

FOREIGN PATENT DOCUMENTS

| | | |
|---|---|---|
| GB | 946703 | 1/1964 |
| GB | 2004604 | 4/1979 |

OTHER PUBLICATIONS

European Search Report dated Nov. 23, 2006 (7 pages).

* cited by examiner

*Primary Examiner*—Robert A Siconolfi
*Assistant Examiner*—San Aung
(74) *Attorney, Agent, or Firm*—Taylor & Aust, P.C.

(57) ABSTRACT

A torque sensing assembly includes an axially fixed sheave having an axis of rotation, and an axially movable sheave movable along the axis in relation to the axially fixed sheave. A compression spring has a first end and a second end, with the first end being positioned to engage the axially movable sheave. A dual stage spring compression mechanism has a spring retainer that engages the second end of the compression spring. The dual stage spring compression mechanism is connected to the axially fixed sheave. The dual stage spring compression mechanism has a first stage compression device that compresses the compression spring by a first preload amount and a second stage compression device that compresses the compression spring by a second preload amount.

12 Claims, 5 Drawing Sheets

TORQUE SENSING ASSEMBLY HAVING DUAL STAGE SPRING COMPRESSION FOR AN AGRICULTURAL MACHINE

FIELD OF THE INVENTION

The present invention is directed to an agricultural machine, and, more particularly, to a torque sensing assembly having dual stage spring compression.

BACKGROUND OF THE INVENTION

One form of an agricultural machine is an agricultural combine. Agricultural combines are engine powered machines that harvest, thresh, separate and clean an agricultural crop, such as for example, corn, soybeans, wheat, etc. An agricultural combine typically includes a transmission device to transfer rotary motion of the engine to various components, such as for example, to a feederhouse drive. One such feeder house drive includes a belt driven assembly that provides for variable rotational speeds of the driven shaft to which the drive is attached.

One type of drive is referred to in the art as a torque sensing drive. Such a torque sensing drive is configured as an assembly including a spring assembly that couples an axially movable sheave to an axially fixed sheave. The spring assembly includes a coil spring that is carried between a spring retainer and the axially movable sheave. Since the coil spring is in a constant state of compression, many components within the torque sensing drive are not serviceable without removal of the entire drive from the agricultural machine. Furthermore, disassembly and reassembly of the torque sensing drive typically requires the use of press, such as a hydraulic press, to compress the coil spring.

SUMMARY OF THE INVENTION

The invention facilitates assembly and disassembly of the torque sensing drive assembly on the agricultural machine, if desired, i.e., without having to remove of the entire torque sensing drive assembly as a unit from the agricultural machine, by utilizing a dual stage spring compression mechanism.

The invention, in one form thereof, is directed to a torque sensing assembly for an agricultural machine. The torque sensing assembly includes an axially fixed sheave having an axis of rotation, and an axially movable sheave movable along the axis in relation to the axially fixed sheave. A compression spring has a first end and a second end, with the first end being positioned to engage the axially movable sheave. A dual stage spring compression mechanism has a spring retainer that engages the second end of the compression spring. The dual stage spring compression mechanism is connected to the axially fixed sheave. The dual stage spring compression mechanism has a first stage compression device that compresses the compression spring by a first preload amount and a second stage compression device that compresses the compression spring by a second preload amount.

The invention, in another form thereof, is directed to an agricultural machine including an engine, a gearbox having an input shaft, and a torque sensing assembly connected to the input shaft and rotatably coupled to the engine via a belt-type drive system. The torque sensing assembly includes an axially fixed sheave having an axis of rotation, and an axially movable sheave movable along the axis in relation to the axially fixed sheave. A compression spring has a first end and a second end, the first end being positioned to engage the axially movable sheave. A dual stage spring compression mechanism has a spring retainer that engages the second end of the compression spring. The dual stage spring compression mechanism is connected to the axially fixed sheave. The dual stage spring compression mechanism has a first stage compression device that compresses the compression spring by a first preload amount and a second stage compression device that compresses the compression spring by a second preload amount.

The invention, in another form thereof, is directed to a torque sensing assembly for an agricultural machine. The torque sensing assembly includes an axially fixed sheave having a first set of threaded holes and a second set of threaded holes, and an axially movable sheave. A cam assembly is interposed between the axially fixed sheave and the axially movable sheave. A spring assembly couples the axially movable sheave to the axially fixed sheave. The axially movable sheave is movable along the axis in relation to the axially fixed sheave. The spring assembly includes a spring preload ring having a first plurality of holes and a second plurality of holes. A spring retainer has a third plurality of holes. Each of a plurality of pins has a head and a shank extending from the head. Each pin shank slidably passes through one of the first plurality of holes in the spring preload ring. The pin shank is fixedly attached to the spring retainer, and each pin head prevents a corresponding pin from pulling through the first plurality of holes in the spring preload ring. A compression spring is positioned between the axially movable sheave and the spring retainer. A first set of bolts have a first head and a first threaded shank. The first set of bolts are received through the second plurality of holes in the spring preload ring and threaded into the first set of threaded holes in the fixed axial sheave, wherein the first set of bolts are tightened to compress the compression spring by a first preload amount. A second set of bolts have a second head and a second threaded shank. The second set of bolts are received through the third plurality of holes in the spring retainer and threaded into the second set of threaded holes in the fixed axial sheave after the compression spring is compressed by the first preload amount. The second set of bolts are tightened to further compress the compression spring by a second preload amount.

The invention, in another form thereof, is directed to a method of assembling a torque sensing assembly having a compression spring, for use in an agricultural machine. The method includes compressing the compression spring with a first stage compression device on the agricultural machine by a first preload amount, and compressing the compression spring with a second stage compression device on the agricultural machine by a second preload amount after compressing the compression spring by the first preload amount.

The invention, in another form thereof, is directed to a method of disassembling a torque sensing assembly having a compression spring, for use in an agricultural machine. The method includes decompressing the compression spring by a first amount by releasing one stage of a dual stage spring compression mechanism on the agricultural machine, and decompressing the compression spring by a second amount by releasing the other stage of the dual stage spring compression mechanism on the agricultural machine.

DETAILED DESCRIPTION OF THE INVENTION

Figure 1:
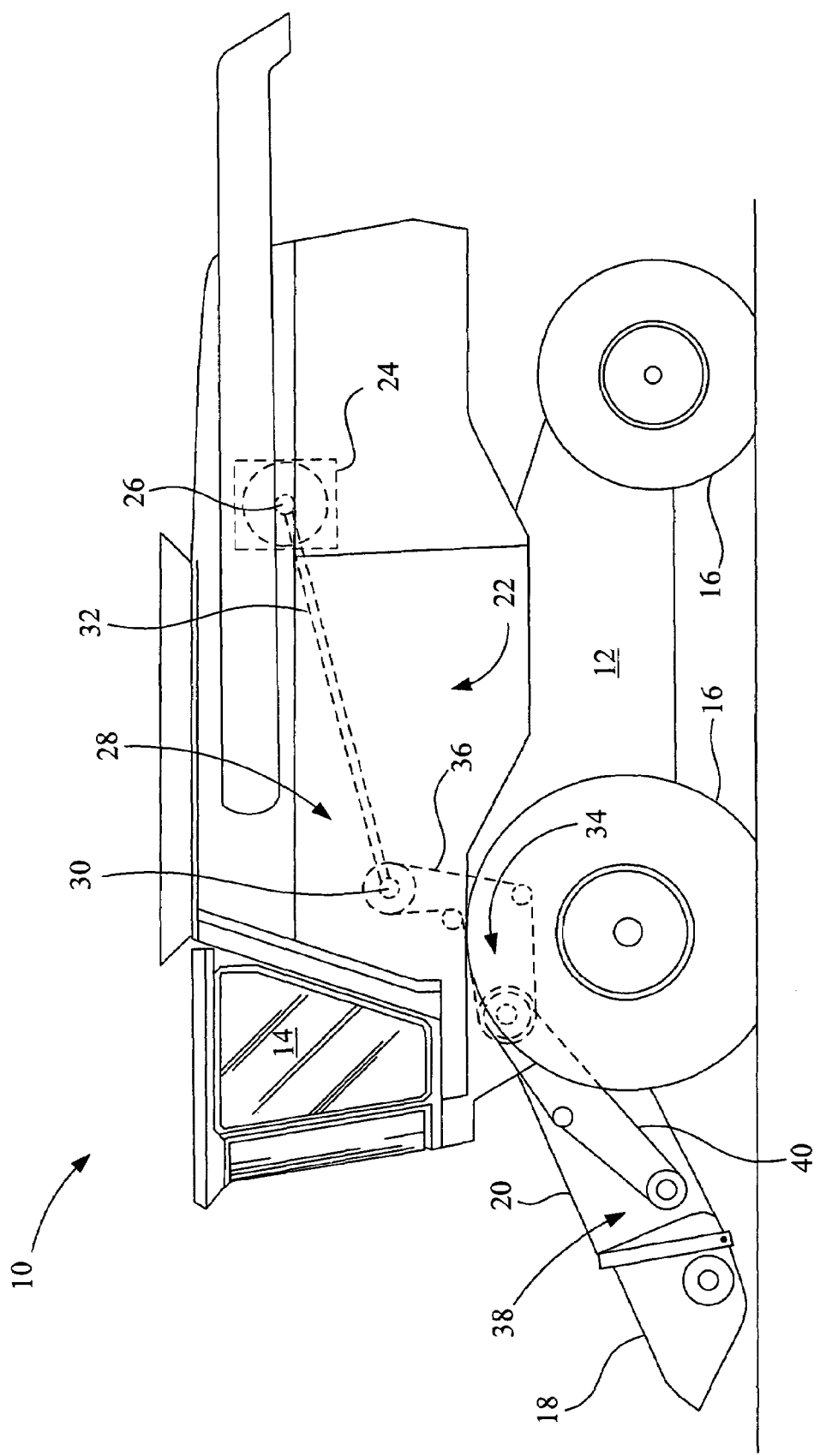
FIG. 1 is a diagrammatic side view of an agricultural machine embodying the present invention.

Referring now to the drawings, and more particularly to FIG. 1, there is shown an agricultural machine 10 in the form of a self-propelled combine. In the embodiment shown, agricultural machine 10 is in the form of a self-propelled agricultural combine. Although the invention is being described as being incorporated into a combine, it is contemplated that the present invention may be used with other types of agricultural machines.

Agricultural machine 10, in the form of a combine, includes a supporting structure 12. An elevated operator's station 14 is mounted at the front of agricultural machine 10. A propulsion unit 16, which may include tires and/or tracks that engage the ground, is coupled to supporting structure 12, and performs propulsion and/or steering functions. A harvesting platform 18 is used for harvesting a crop and directing the crop to a feederhouse 20. The harvested crop is directed by feederhouse 20 to a main separator body 22, which performs threshing, separating and cleaning operations.

A transversely oriented internal combustion engine 24 provides the mechanical power needed to perform the propulsion, harvesting, threshing, separating and cleaning operations. Engine 24 includes an output power shaft 26 coupled to a belt-type drive system 28. Belt-type drive system 28 includes a primary countershaft 30 connected to output power shaft 26 of engine 24 by a shaft and gearbox configuration 32, which is schematically illustrated. A variable speed assembly 34 is connected to the primary countershaft 30 by a drive belt 36. Variable speed assembly 34 is connected to a power transmission assembly 38 via a V-belt 40.

Referring to FIGS. 2-5, power transmission assembly 38, e.g., a feederhouse drive, includes a planetary gearbox 42 and a torque sensing assembly, e.g., sheave assembly, 44.

Planetary gearbox 42 includes an input shaft 46, e.g., a hollow driven shaft, having an axis 48. Input shaft 46 is a hub-like extension of an input sun gear (not shown) in planetary gearbox 42. Input shaft 46 of planetary gearbox 42 includes a first shaft portion 50 having an outside diameter D1, a second shaft portion 52 having an outside diameter D2 and a beveled shoulder 54 intermediate of first shaft portion 50 and second shaft portion 52. Diameter D2 is smaller than diameter D1. Second shaft portion 52 has a plurality of perimetrical splines 56 and has a threaded end 58. Perimetrical splines 56 are oriented parallel to axis 48, and have an overall diameter corresponding to diameter D2. A drive shaft 60 extends outwardly through input shaft 46 and includes a splined end 62 for coupling to a variable length header drive shaft (not shown) for driving harvesting platform 18.

Torque sensing assembly 44 is carried on input shaft 46 of planetary gearbox 42, and is mounted to input shaft 46 for rotation therewith. Torque sensing assembly 44, driven by the V-belt 40, is of the variable effective diameter torque-sensing or torque responsive type, and includes an axially fixed sheave 64 and an axially movable sheave 66 that is movable in relation to axially fixed sheave 64 along axis 48. Axis 48 serves as an axis of rotation for axially fixed sheave 64 and axially movable sheave 66 torque sensing assembly 44. Axially fixed sheave 64 has an inner belt engaging surface 68, and axially movable sheave 66 has an outer belt engaging surface 70.

A spring assembly 72 couples axially movable sheave 66 to axially fixed sheave 64. Spring assembly 72 includes a compression spring 74, e.g., a coil spring, carried between a spring retainer 76 and axially movable sheave 66, which biases axially movable sheave 66 axially along axis 48 towards axially fixed sheave 64 in the direction of increasing effective belt engaging diameter of sheave halves 64, 66. Compression spring 74 has a first end 75 positioned to engage axially movable sheave 66 and a second end 77 positioned to engage spring retainer 76.

Axially fixed sheave 64 includes a hub portion 78 having a proximal end 80 and a distal end 82. Hub portion 78 has a first bore 84 having of an inside diameter D3 with interior splines 86 formed therein to engage perimetrical splines 56 of input shaft 46 when axially fixed sheave 64 is installed over input shaft 46 along axis 48. The engagement of interior splines 86 of axially fixed sheave 64 with perimetrical splines 56 of input shaft 46 transfers the rotary motion of torque sensing assembly 44 to input shaft 46. Hub portion 78 has an annular tapered face 88 extending increasingly outward from inside diameter D3 to engage beveled shoulder 54 of input shaft 46. Distal end 82 of hub portion 78 of axially fixed sheave 64 includes a second bore 90 with an inside diameter D4 larger than diameter D3 of first bore 84 to form an internal annular ledge 92 extending from first bore 84 to second bore 90.

Figure 2:
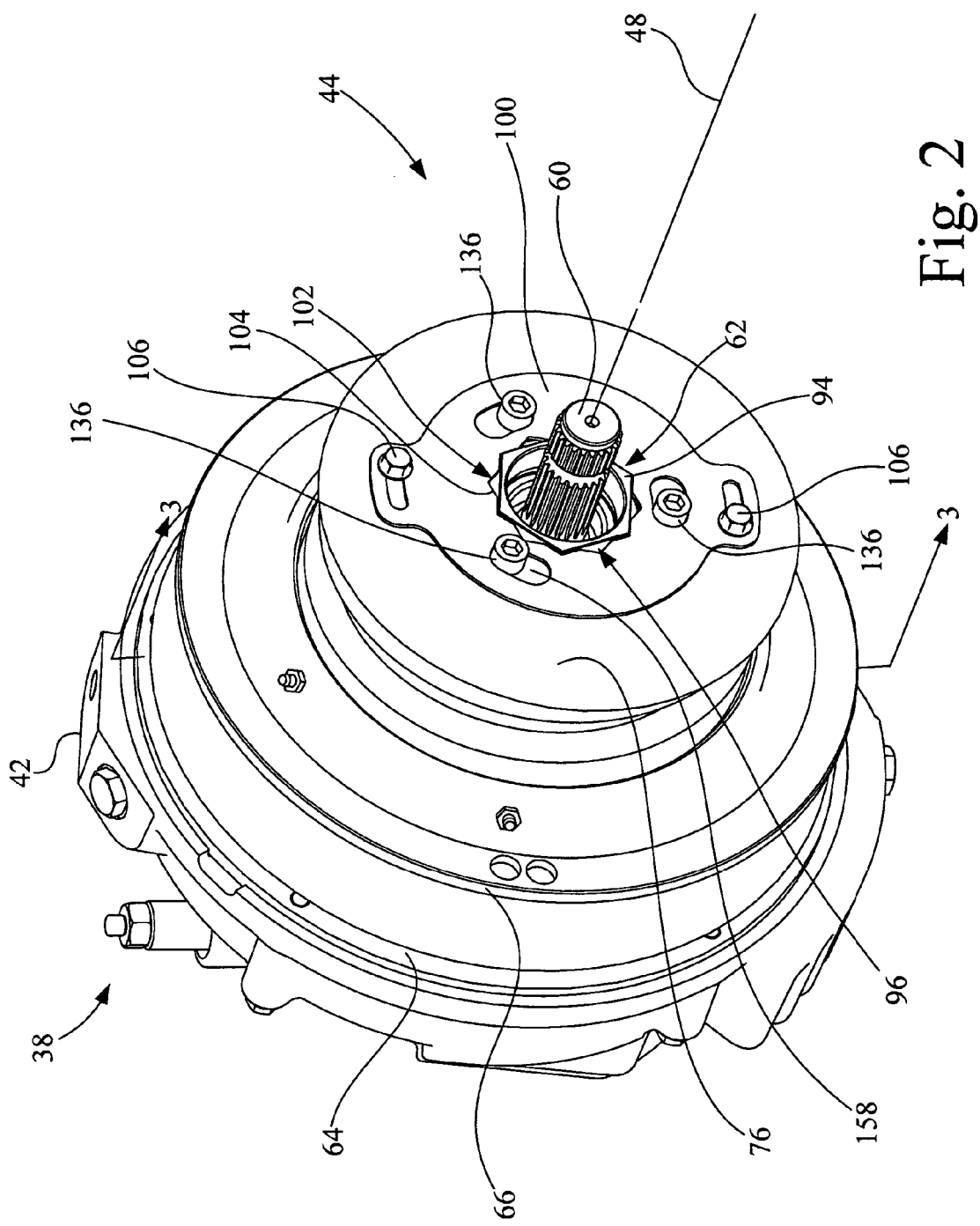
FIG. 2 is a perspective end view of the power transmission assembly of the agricultural machine of FIG. 1.
Figure 3:
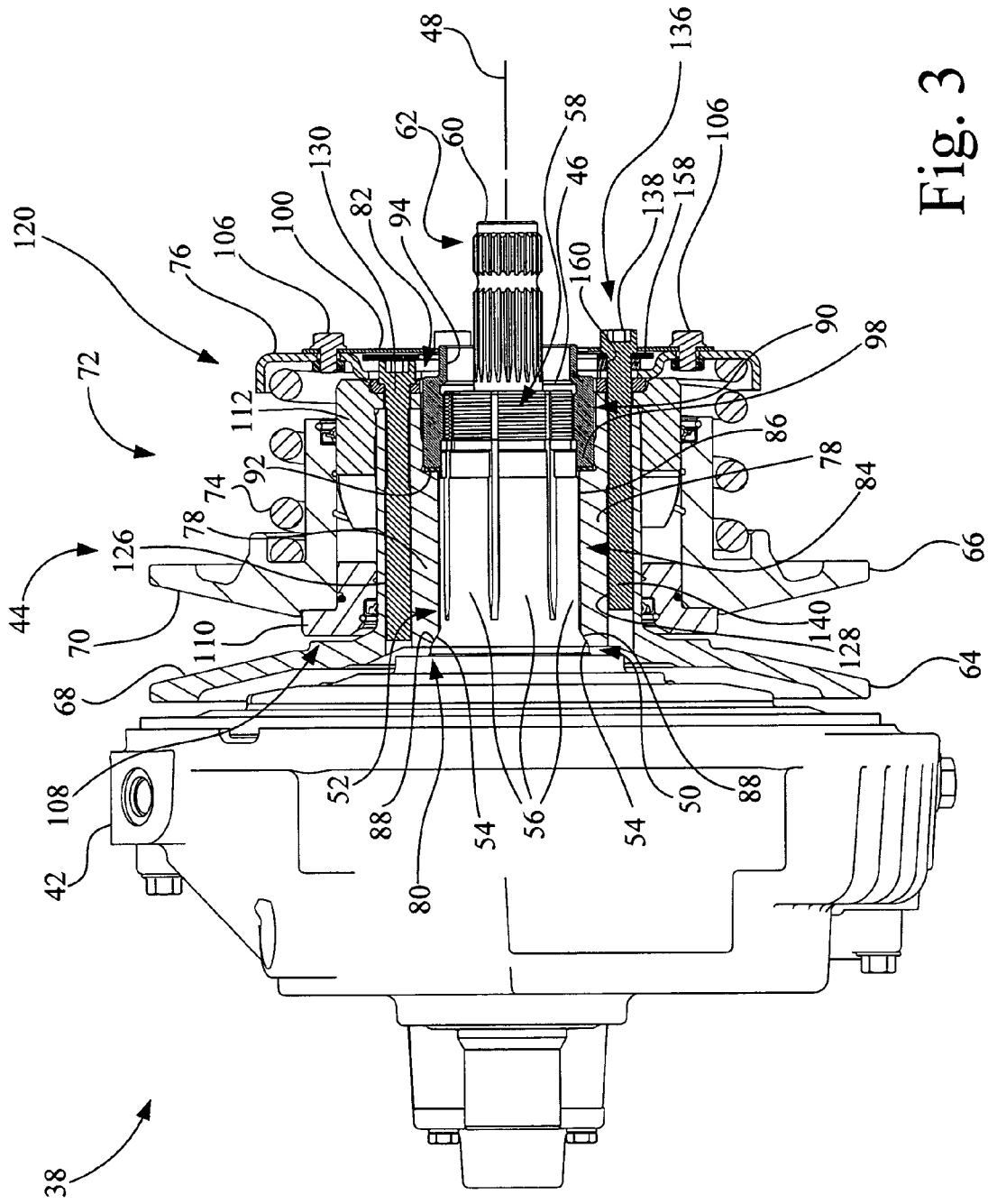
FIG. 3 is a perspective side view of the power transmission assembly of FIG. 2 with the torque sensing assembly shown in a sectional view in a fully assembled state after applying dual stage compression of the compression spring in accordance with the present invention.
Figure 4:
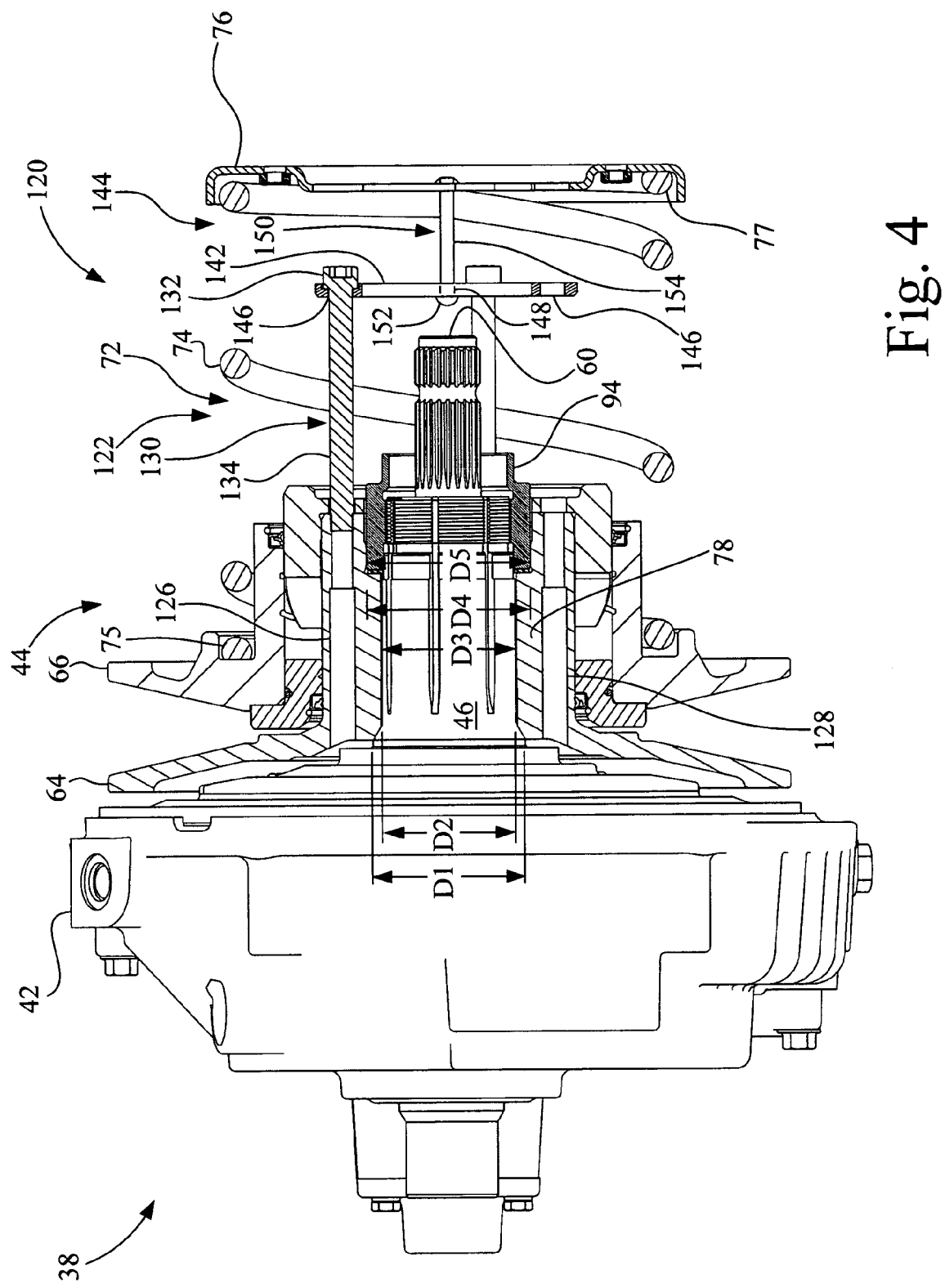
FIG. 4 is a perspective side view of the power transmission assembly of FIG. 2 with the torque sensing assembly shown in a sectional view at the beginning of first stage compression of the compression spring of the torque sensing assembly.
Figure 5:
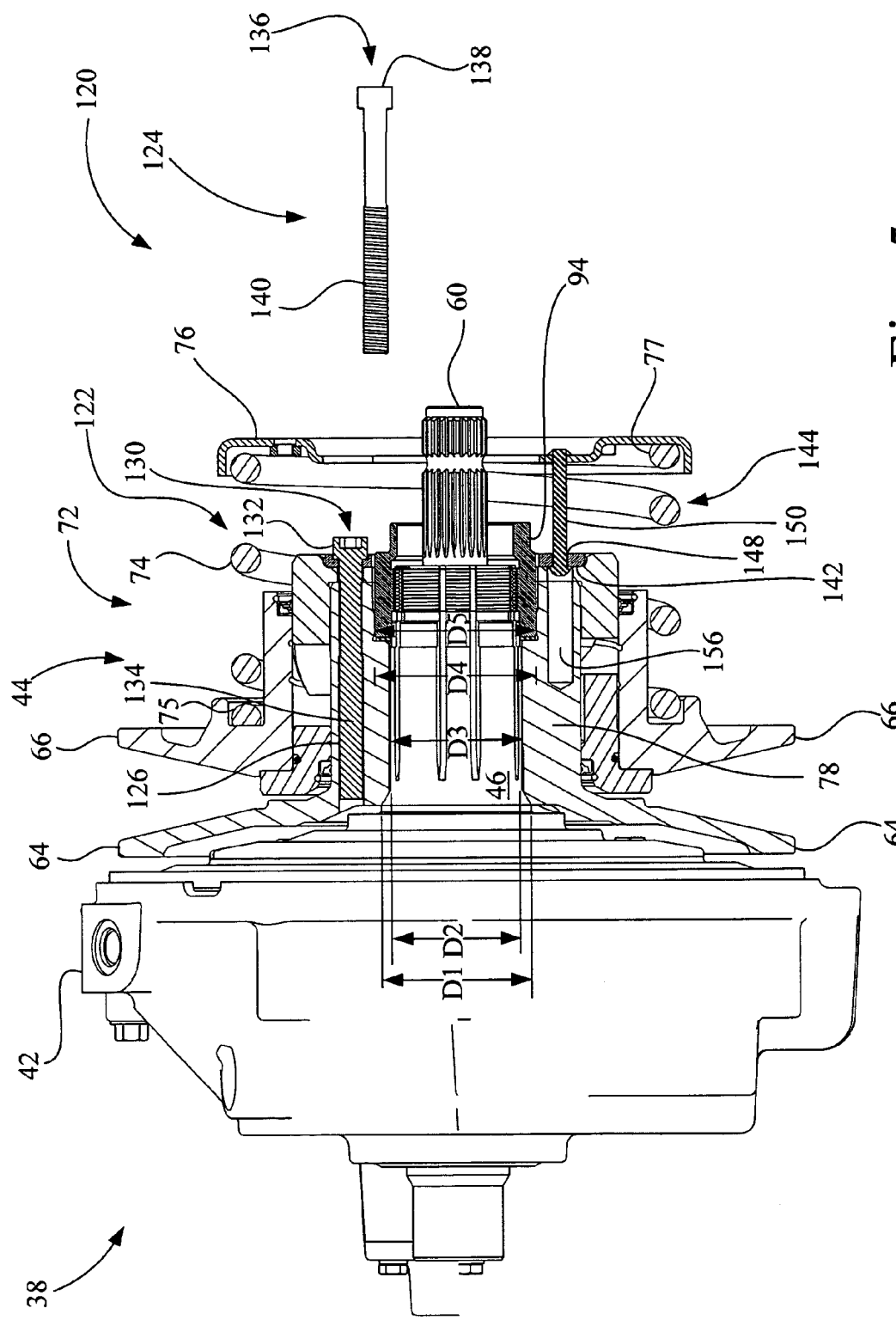
FIG. 5 is a perspective side view of the power transmission assembly of FIG. 2 with the torque sensing assembly shown in a sectional view after completion of the first stage compression of the compression spring of the torque sensing assembly.

As shown in FIGS. 3-5, a single nut 94 and annular beveled shoulder 54 of input shaft 46 provide axial containment of torque sensing assembly 44 along axis 48 on input shaft 46. As best shown in FIG. 2, nut 94 has a plurality of surfaces 96, e.g., six, as a hex-nut, arranged in a polygonal pattern. Nut 94 engages threaded end 58 of input shaft 46, such that when tightened, nut 94 forces tapered face 88 of axially fixed sheave 64 into engagement with beveled shoulder 54 of input shaft 46. Nut 94 includes a cylindrical portion 98 sized with an outside diameter D5 intermediate inside diameter D3 of first bore 84 and inside diameter D4 of second bore 90. Cylindrical portion 98 is received in second bore 90 to engage internal annular ledge 92 as nut 94 is tightened.

A locking plate 100 is provided to prevent nut 94 from loosing after being torqued to the desired tightness. Locking plate 100 has an opening 102 defined by a plurality of internal surfaces 104 for engaging at least two of the plurality of surfaces 96 of nut 94. The plurality of internal surfaces 104 may be arranged, for example, in a 12-point star pattern for selective engagement with the 6-point pattern of nut 94, depending on the rotational position of nut 94 around axis 48. Locking plate 100 is secured to torque sensing assembly 44 by at least one fastener 106.

The torque-sensing or torque responsiveness of torque sensing assembly 44 depends upon control of relative rotation between the two sheave halves 64 and 66, and is effected by a cam assembly 108 annularly contained between axially fixed sheave 64 and axially movable sheave 66. Thus, cam assembly 108 is interposed between axially fixed sheave 64 and axially movable sheave 66. Cam assembly 108 includes an inner cam 110 and an outer cam 112, and is so disposed between axially fixed sheave 64 and axially movable sheave 66 that any tendency for relative rotation between the sheave halves 64, 66 results in a cam action that biases axially movable sheave 66 toward axially fixed sheave 64.

FIGS. 2 and 3 show torque sensing assembly 44 in a fully assembled state after applying the dual stage compression of compression spring 74 in accordance with the present invention. FIG. 4 shows torque sensing assembly 44 at the beginning of the first stage compression of compression spring 74, and FIG. 5 shows torque sensing assembly 44 in a sectional view after completion of the first stage compression of compression spring 74.

Torque sensing assembly 44 includes a dual stage spring compression mechanism 120 that incorporates spring retainer 76. Dual stage spring compression mechanism 120 is connected to axially fixed sheave 64, as will be further described below. Dual stage spring compression mechanism 120 has a first stage compression device 122 that compresses compression spring 74 by a first preload amount and a second stage compression device 124 that compresses compression spring 74 by a second preload amount, with the first preload amount and the second preload amount being applied sequentially to compression spring 74.

Referring to FIGS. 3 and 4, axially fixed sheave 64 includes a first set of threaded holes 126, e.g., three holes, and a second set of threaded holes 128, e.g., three holes. First stage compression device 122 includes a first set of bolts 130 that engage, i.e., are threaded into, the first set of threaded holes 126, wherein tightening the first set of bolts compresses compression spring 74 by the first preload amount. Referring to FIG. 4, each of the first set of bolts 130 includes a head 132 and a threaded shank 134. Second stage compression device 124 includes a second set of bolts 136 that are received into and engage i.e., are threaded into, the second set of threaded holes 128 after compression spring 74 is compressed by the first preload amount, wherein tightening the second set of bolts 136 compresses compression spring 74 by the second preload amount. Referring to FIG. 5, each of the second set of bolts 136 includes a head 138 and a threaded shank 140.

As can be best seen in FIGS. 4 and 5, dual stage spring compression mechanism 120 includes a spring preload ring 142, and a slide coupling 144 that connects spring preload ring 142 to spring retainer 76. Spring preload ring 142 has a plurality of holes 146 through which the first set of bolts 130 extend. The heads 132 of the first set of bolts 130 engage spring preload ring 142 to compress compression spring 74 when the first set of bolts 130 are tightened.

Spring preload ring 142 further includes a plurality of holes 148 and slide coupling includes a plurality of pins 150. Each of the plurality of pins 150 has a head 152 and a shank 154 extending from head 152. Each shank 154 slidably passes through one of the plurality of holes 148 in spring preload ring 142. Also, the shank 154 of each pin of the plurality of pins 150 is fixedly attached, e.g., welded, screwed, etc., to spring retainer 76. Each head 152 of the plurality of pins 150 prevent the corresponding pin from pulling through the plurality of holes 148 in spring preload ring 142. As best seen in FIG. 5, axially fixed sheave 64 includes a plurality of pockets 156 for respectively receiving the plurality of pins 150 as the second set of bolts 136 of second stage compression device 124 are tightened to compress compression spring 74 by the second preload amount.

Referring to FIGS. 2 and 3, a cover plate 158 is provided for covering over the first set of bolts 130. Cover plate 158 has a plurality of holes 160 through which the second set of bolts 136 extend. Each head 138 of the second set of bolts 136 engages cover plate 158, which in turn engages spring retainer 76 to compress compression spring 74 when the second set of bolts 136 are tightened, i.e., cover plate 158 is interposed between the heads 138 of the second set of bolts 136 and spring retainer 76. Thus, the second set of bolts 136 indirectly engage spring retainer 76. If desired, spring retainer 76 may be equipped with a plurality of oversize holes through which the second set of bolts 136 also extend after passing through the plurality of holes 160 of cover plate 158. The diameter of the oversized holes may be sized larger than the heads of the second set of bolts 136 to ensure that cover plate 158 must be installed to effect the second stage of compression.

Alternatively, if cover plate 158 is not used, spring retainer 76 may be equipped with a plurality of holes through which the second set of bolts 136 extend, wherein the heads 138 of the second set of bolts 136 directly engage spring retainer 76 to compress compression spring 74 when the second set of bolts 136 are tightened.

In accordance with the present invention, a method is provided for assembling torque sensing assembly 44 having a compression spring 74, for use in agricultural machine. The method includes compressing compression spring 74 with first stage compression device 122 on agricultural machine 10 by a first preload amount, for example, with axially fixed sheave 64 and axially movable sheave 66 installed on agricultural machine 10. Thereafter, the method includes compressing compression spring 74 with second stage compression device 124 on agricultural machine 10 by a second preload amount, i.e., after compressing compression spring 74 by the first preload amount.

The discussion above is directed to assembling torque sensing assembly 44. Those skilled in the art will recognize that assembly method may be reversed to provide for disassembly of torque sensing assembly 44. Thus, in accordance with the present invention, a method of disassembling a torque sensing assembly 44 includes decompressing compression spring 74 by a first amount by releasing one stage, e.g., second stage compression device 124, of dual stage spring compression mechanism 120 on agricultural machine 10, i.e., with axially fixed sheave 64 and axially movable sheave 66 installed on agricultural machine 10. Thereafter, the method of decompressing includes decompressing compression spring 74 by a second amount by releasing the other stage, e.g., first stage compression device 122, of dual stage spring compression mechanism 120 on agricultural machine 10.

By using a cover plate, such as cover plate 158, a specific sequence for disassembly of torque sensing assembly 44 may be defined. In other words, cover plate 158 may be configured such that during disassembly of torque sensing assembly 44 the second set of bolts 136 must be removed to decompress compression spring 74 by the second preload amount, and the cover plate 158 must be removed, prior to being able to access and remove the first set of bolts 130 to decompress compression spring 74 by the first preload amount.

Having described the preferred embodiment, it will become apparent that various modifications can be made without departing from the scope of the invention as defined in the accompanying claims.

The invention claimed is:

1. A torque sensing assembly for an agricultural machine, comprising:

an axially fixed sheave having an axis of rotation;

an axially movable sheave movable along said axis in relation to said axially fixed sheave;

a compression spring having a first end and a second end, said first end being positioned to engage said axially movable sheave; and a dual stage spring compression mechanism having a spring retainer that engages said second end of said compression spring, said dual stage spring compression mechanism being connected to said axially fixed sheave, said dual stage spring compression mechanism having a first stage compression device that compresses said compression spring by a first preload amount and a second stage compression device that compresses said compression spring by a second preload amount, said axially fixed sheave includes a first set of threaded holes and a second set of threaded holes, said first stage compression device including a first set of bolts that engage said first set of threaded holes, wherein tightening said first set of bolts compresses said compression spring by said first preload amount, said second stage compression device including a second set of bolts that engage said second set of threaded holes after said compression spring is compressed by said first preload amount, wherein tightening said second set of bolts compresses said compression spring by said second preload amount, said dual stage spring compression mechanism includes a spring preload ring, and a slide coupling that connects said spring preload ring to said spring retainer, said spring preload ring having a first plurality of holes through which said first set of bolts extend, each of said first set of bolts having a head that engages said spring preload ring to compress said compression spring when said first set of bolts are tightened.

2. The torque sensing assembly of claim 1, said spring retainer having a plurality of holes through which said second set of bolts extend, each of said second set of bolts having a head that engages said spring retainer to compress said compression spring when said second set of bolts are tightened.

3. The torque sensing assembly of claim 1, further comprising a cover plate for covering over said first set of bolts, said cover plate having a plurality of holes through which said second set of bolts extend, each of said second set of bolts having a second head that engages said cover plate to compress said compression spring when said second set of bolts are tightened, said cover plate being interposed between the second heads of said second set of bolts and said spring retainer.

4. The torque sensing assembly of claim 1, wherein said spring preload ring includes a second plurality of holes and said slide coupling includes a plurality of pins, each of said plurality of pins having a head and a shank extending from said head, each said shank slidably passing through one of said second plurality of holes in said spring preload ring, said shank being fixedly attached to said spring retainer, each said head preventing a corresponding pin from pulling through said first plurality of holes in said spring preload ring.

5. The torque sensing assembly of claim 4, wherein said axially fixed sheave includes a plurality of pockets for receiving said plurality of pins as said second set of bolts of said second stage compression device are tightened to compress said compression spring by said second preload amount.

6. An agricultural machine, comprising:
an engine;
a gearbox having an input shaft; and
a torque sensing assembly connected to said input shaft and rotatably coupled to said engine via a belt-type drive system, said torque sensing assembly including:
an axially fixed sheave having an axis of rotation;
an axially movable sheave movable along said axis in relation to said axially fixed sheave;
a compression spring having a first end and a second end, said first end being positioned to engage said axially movable sheave; and
a dual stage spring compression mechanism having a spring retainer that engages said second end of said compression spring, said dual stage spring compression mechanism being connected to said axially fixed sheave, said dual stage spring compression mechanism having a first stage compression device that compresses said compression spring by a first preload amount and a second stage compression device that compresses said compression spring by a second preload amount, said axially fixed sheave includes a first set of threaded holes and a second set of threaded holes, said first stage compression device including a first set of bolts that engage said first set of threaded holes, wherein tightening said first set of bolts compresses said compression spring by said first preload amount, said second stage compression device including a second set of bolts that engage said second set of threaded holes after said compression spring is compressed by said first preload amount, wherein tightening said second set of bolts compresses said compression spring by said second preload amount, said dual stage spring compression mechanism includes a spring preload ring, and a slide coupling that connects said spring preload ring to said spring retainer, said spring preload ring having a first plurality of holes through which said first set of bolts extend, each of said first set of bolts having a head that engages said spring preload ring to compress said compression spring when said first set of bolts are tightened.

7. The agricultural machine of claim 6, said spring retainer having a plurality of holes through which said second set of bolts extend, each of said second set of bolts having a head that engages said spring retainer to compress said compression spring when said second set of bolts are tightened.

8. The agricultural machine of claim 6, further comprising a cover plate for covering over said first set of bolts, said cover plate having a plurality of holes through which said second set of bolts extend, each of said second set of bolts having a second head that engages said cover plate to compress said compression spring when said second set of bolts are tightened, said cover plate being interposed between the second heads of said second set of bolts and said spring retainer.

9. The agricultural machine of claim 6, wherein said spring preload ring includes a second plurality of holes and said slide coupling includes a plurality of pins, each of said plurality of pins having a head and a shank extending from said head, each said shank slidably passing through one of said second plurality of holes in said spring preload ring, said shank being fixedly attached to said spring retainer, each said head preventing a corresponding pin from pulling through said first plurality of holes in said spring preload ring.

10. The agricultural machine of claim 9, wherein said axially fixed sheave includes a plurality of pockets for receiving said plurality of pins as said second set of bolts of said second stage compression device are tightened to compress said compression spring by said second preload amount.

11. A torque sensing assembly for an agricultural machine, comprising:
an axially fixed sheave having a first set of threaded holes and a second set of threaded holes, said axially fixed sheave having an axis of rotation;
an axially movable sheave;
a cam assembly interposed between said axially fixed sheave and said axially movable sheave;

a spring assembly coupling said axially movable sheave to said axially fixed sheave, said axially movable sheave being movable along said axis in relation to said axially fixed sheave, said spring assembly including:

a spring preload ring having a first plurality of holes and a second plurality of holes;

a spring retainer having a third plurality of holes;

a plurality of pins, each of said plurality of pins having a head and a shank extending from said head, each said shank slidably passing through one of said first plurality of holes in said spring preload ring, said shank being fixedly attached to said spring retainer, each said head preventing a corresponding pin from pulling through said first plurality of holes in said spring preload ring;

a compression spring positioned between said axially movable sheave and said spring retainer;

a first set of bolts, each having a first head and a first threaded shank, said first set of bolts being received through said second plurality of holes in said spring preload ring and threaded into said first set of threaded holes in said fixed axial sheave, wherein said first set of bolts are tightened to compress said compression spring by a first preload amount;

a second set of bolts, each having a second head and a second threaded shank, said second set of bolts being received through said third plurality of holes in said spring retainer and threaded into said second set of threaded holes in said fixed axial sheave after said compression spring is compressed by said first preload amount, wherein said second set of bolts are tightened to further compress said compression spring by a second preload amount.

12. The torque sensing assembly of claim 11, further comprising a cover plate interposed between the second heads of said second set of bolts and said spring retainer, said cover plate covering over said first set of bolts.

* * * * *